(12) United States Patent
Bera

(10) Patent No.: US 7,043,510 B1
(45) Date of Patent: May 9, 2006

(54) DETERMINING THE EQUIVALENCE OF TWO SETS OF SIMULTANEOUS LINEAR ALGEBRAIC EQUATIONS

(75) Inventor: Rajendra Kumar Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 09/597,478

(22) Filed: Jun. 20, 2000

(51) Int. Cl.
*G06F 15/00* (2006.01)
*G06F 13/00* (2006.01)

(52) U.S. Cl. ..................................... 708/200; 708/160
(58) Field of Classification Search ............... 708/446, 708/490, 524, 520, 200, 607, 160; 703/14; 716/20
See application file for complete search history.

(56) References Cited

U.S. PATENT DOCUMENTS

| | | | | |
|---|---|---|---|---|
| 3,621,209 A | * | 11/1971 | Businger | 708/446 |
| 5,200,915 A | * | 4/1993 | Hayami et al. | 708/520 |
| 5,392,429 A | * | 2/1995 | Agrawal et al. | 708/446 |
| 5,442,569 A | * | 8/1995 | Osano | 716/20 |
| 6,144,932 A | * | 11/2000 | Hachiya | 703/14 |

FOREIGN PATENT DOCUMENTS

JP  11-110225  4/1999

OTHER PUBLICATIONS

Stoer et al., Introduction to Numerical Analysis, 1980, Springer-Verlag New York Heidelberg Berlin, pp. 97-102, 144-147, and 159-161.*
Ledermann, W, & Vajda, S., (EDS), Algebra vol. 1 of Handbook of Applicable Mathematics, John Wiley & Sons, New York, 1980, Chapter 8.

Press, W. H., Teukolsky, S.A., Vetterling, W. T., Flannery, B. P., Numerical Recipes in FORTRAN, Second Edition, Cambridge Univ. Press, 1992, Chapter 2.
Ralston, A., A First Course in Numerical Analysis, International Student Edition, McGraw-Hill, New York, 1965, Chapter 9.

* cited by examiner

*Primary Examiner*—Todd Ingberg
*Assistant Examiner*—Chat C. Do
(74) *Attorney, Agent, or Firm*—Anthony VS England; T. Rao Coca

(57) ABSTRACT

A computer implemented method (200) is described for determining the equivalence of two sets of simultaneous linear algebraic equations. Each of said equations is of a form:

$$e_{i1}x_1+e_{i2}x_2+e_{i3}x_3+ \ldots +e_{in}x_n=b_i$$

where $x_j$ are unknowns, $e_{ij}$ are coefficients and $b_i$ are quantities, and defining the relationship between the unknowns within the set. The coefficients and quantities are known algebraic expressions. The unknowns are iteratively eliminated (250 to 280) from each of the sets of simultaneous linear algebraic equations until each of said equations are in the form:

$$(l_{ii})_k x_i = (r_i)_k$$

wherein $l_{ii}$ and $r_i$ are algebraic expressions, and $k=\{1;2\}$ indicate one of said sets that said equation is derived from. The products $(l_{ii})_1 * (r_i)_2$ and $(l_{ii})_2 * (r_i)_1$ are compared (300) for each of the unknowns. Only if the products match (310) for all the unknowns are the two sets of simultaneous linear algebraic equations equivalent (312). An apparatus (100) for performing the above method (200) is also provided.

9 Claims, 2 Drawing Sheets

DETERMINING THE EQUIVALENCE OF TWO SETS OF SIMULTANEOUS LINEAR ALGEBRAIC EQUATIONS

TECHNICAL FIELD OF THE INVENTION

The present invention relates to a computer implementable method, and in particular, to a method and apparatus for determining whether two sets of simultaneous linear algebraic equations are equivalent.

BACKGROUND ART

In many applications, the need arises to solve one or more systems of simultaneous linear algebraic equations (SLAEs) whose coefficient matrices comprise only numerical elements. Such applications include engineering and simulation computer codes. Solutions of the SLAE are typically obtained by using the well-known Gaussian elimination method. Therefore, prior methods typically would solve two such SLAE systems $S_1$ and $S_2$, and compare their solutions. However, such methods may not always work if one or both of the SLAEs are ill-conditioned and/or the numerical precision used in computations is not high enough.

Furthermore, such methods are generally not adapted to solving a set of SLAEs whose coefficient matrix elements are algebraic expressions, and for which the solution will, in general, be in algebraic form.

DISCLOSURE OF THE INVENTION

It is an object of the present invention to provide a method of determining whether two sets of simultaneous linear algebraic equations are equivalent.

The invention provides a computer implemented method for determining the equivalence of two sets of simultaneous linear algebraic equations (SLAEs), each of the sets comprising two or more algebraic equations. The method comprising the steps of:

reducing each SLAE to a standard form; and
comparing the SLAEs to determine whether equivalence exists.

The invention further provides a computer implemented method of determining the equivalence of a first and a second set of simultaneous linear algebraic equations (SLAEs), with the method comprising the steps of:

iteratively eliminating unknowns from each of the sets of SLAEs to place each SLAE in a two-part standard form; and forming a product of a part of one standard form equation with a part of another part of another standard form equation;

forming a product of the other part of standard form equation with the other part of another standard form equation; and comparing the respective products for mathematical equivalence.

There is further provided a computer implemented method of determining the equivalence of a first and a second set of simultaneous linear algebraic equations, each of the equations being of a form:

$$e_{i1}x_1+e_{i2}x_2+e_{i3}x_3+ \ldots +e_{in}x_n=b_i$$

wherein $x_j$ are unknowns, $e_{ij}$ are coefficients, and $b_i$ are quantities. The coefficients and quantities are known algebraic expressions. The method comprising the steps of:

iteratively eliminating the unknowns from each of the sets of simultaneous linear algebraic equations until each of the equations are in the form:

$$(l_{ii})_k x_i = (r_i)_k$$

wherein $l_{ii}$ and $r_i$ are algebraic expressions, and k={1;2} indicate one of the sets that the equation is derived from; and comparing, for each of the unknowns, the products $(l_{ii})_1 * (r_i)_2$ and $(l_{ii})_2 * (r_i)_1$, wherein the first and the second set of simultaneous linear algebraic equations are equivalent if the products match for all the unknowns.

The invention further discloses a computational apparatus for determining the equivalence of a first and a second set of simultaneous linear algebraic equations, each of the equations being in the form:

$$e_{i1}x_1+e_{i2}x_2+e_{i3}x_3+ \ldots +e_{in}x_n=b_i$$

wherein $x_j$ are unknowns, $e_{ij}$ are coefficients, and $b_i$ are quantities, the coefficients and quantities being known algebraic expressions. The apparatus comprising:

means for iteratively eliminating the unknowns from each of the sets of simultaneous linear algebraic equations until each of the equations are in the form:

$$(l_{ii})_k x_i = (r_i)_k$$

wherein $l_{ii}$ and $r_i$ are algebraic expressions, and k={1;2} indicate one of the sets that the equation is derived from; and means for comparing, for each of the unknowns, the products $(l_{ii})_1 * (r_i)_2$ and $(l_{ii})_2 * (r_i)_1$, wherein the first and the second set of simultaneous linear algebraic equations are equivalent if the products match for all the unknowns.

The invention yet further discloses a computer program product carried by a storage medium for determining the equivalence of a first and a second set of simultaneous linear algebraic equations, each of the equations being of a form:

$$e_{i1}x_1+e_{i2}x_2+e_{i3}x_3+ \ldots +e_{in}x_n=b_i$$

wherein $x_j$ are unknowns, $e_{ij}$ are coefficients, and $b_i$ are quantities, the coefficients and quantities being known algebraic expressions. The computer program product comprising:

a program element for iteratively eliminating the unknowns from each of the sets of simultaneous linear algebraic equations until each of the equations are in the form:

$$(l_{ii})_k x_i = (r_i)_k$$

wherein $l_{ii}$ and $r_i$ are algebraic expressions, and k={1;2} indicate one of the sets that the equation is derived from; and a program element for comparing, for each of the unknowns, the products $(l_{ii})_1 * (r_i)_2$ and $(l_{ii})_2 * (r_i)_1$, wherein the first and the second set of simultaneous linear algebraic equations are equivalent if the products match for all the unknowns.

Preferably, the method further includes recasting the algebraic expressions into a form of one or more token pairs arranged sequentially in a string, each of the token pair comprising an operator followed by an operand; and reducing the strings in accordance with a set of predetermined simplifying rules to obtain reduced expressions. Eliminating the unknowns from each of the sets of simultaneous linear algebraic equations is performed on the reduced strings in accordance with a set of predetermined operations.

Furthermore, the simplifying rules can comprise the steps of arranging token pairs into subgroups, arranging operand tokens in an arranged subgroup in order, reducing the ordered operands by consolidating one or more constants and eliminating variables of opposite effect to form reduced subgroups, and consolidating one or more multiple instances of similar subgroups, to produce a reduced string.

BRIEF DESCRIPTION OF THE DRAWINGS

A preferred embodiment of the present invention will now be described with reference to the drawings in which.

DETAILED DESCRIPTION INCLUDING BEST MODE

Apparatus

Figure 1:
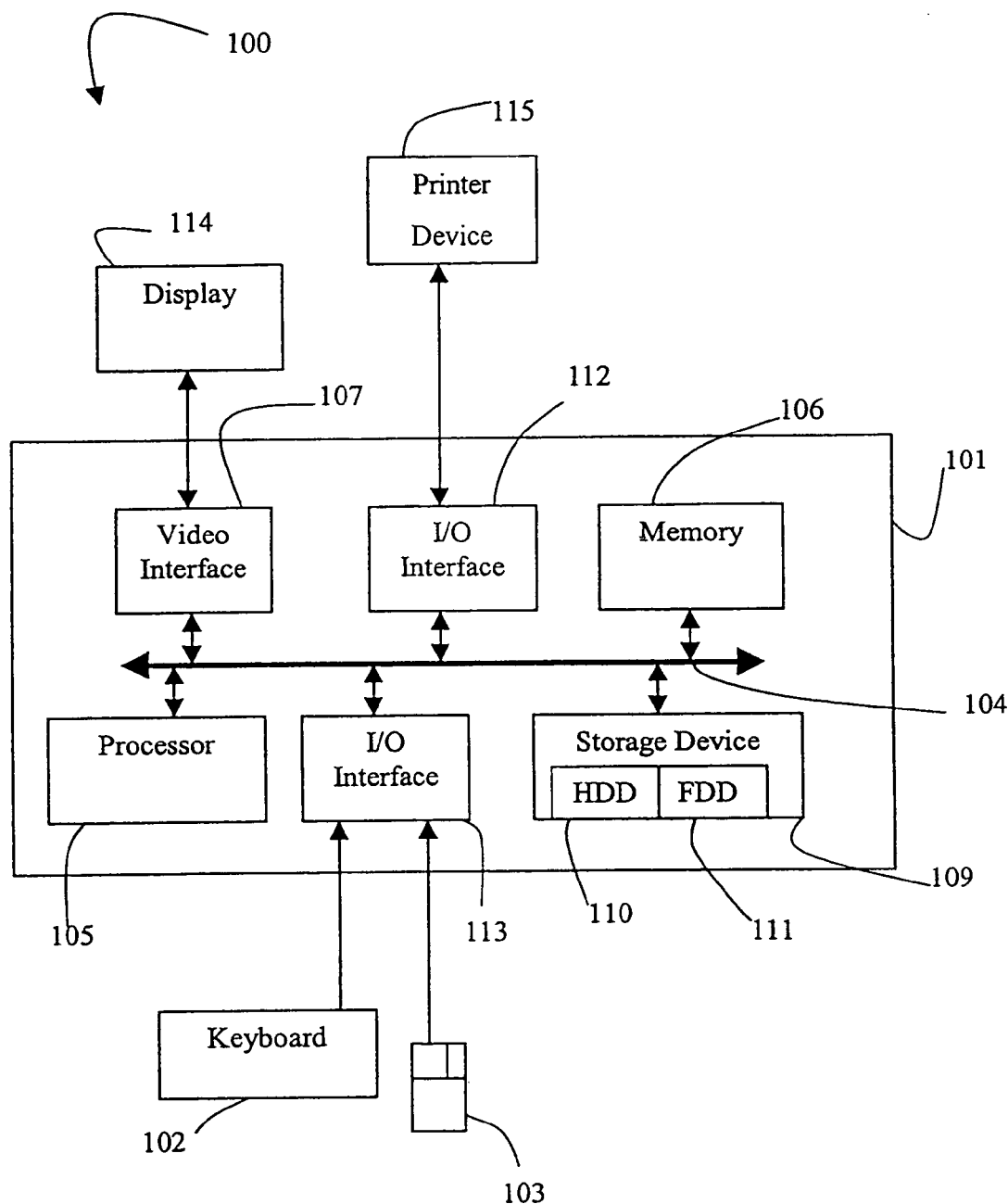
FIG. 1 is a schematic block diagram of a conventional general-purpose computer system upon which the embodiment of the invention may be practised.

A general-purpose computer system 100, upon which the preferred embodiment of the invention may be practised, is shown in FIG. 1. The computer system 100 will first be described, followed more particularly by a description of a method of determining whether two sets of simultaneous linear algebraic equations are equivalent.

This method may be implemented as software, such as an application program executing within the computer system 100. In particular, the steps of the method of determining whether two sets of simultaneous linear algebraic equations are equivalent, are effected by instructions in the software that are carried out by the computer system 100. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer preferably effects an advantageous apparatus for determining whether two sets of simultaneous linear algebraic equations are equivalent, in accordance with the embodiments of the invention.

The computer system 100 comprises a computer module 101, input devices such as a keyboard 102 and mouse 103, and output devices including a printer 115 and a display device 114. The computer module 101 typically includes at least one processor unit 105, a memory unit 106, for example, formed from semiconductor random access memory (RAM) and read only memory (ROM), input/output (I/O) interfaces including a video interface 107, an I/O interface for the printer device 115 and an I/O interface 113 for the keyboard 102 and mouse 103. A storage device 109 is provided and typically includes a hard disk drive 110 and a floppy disk drive 111. A CD-ROM drive (not illustrated) may be provided as a non-volatile source of data. The components 105 to 113 of the computer module 101, typically communicate via an interconnected bus 104 and in a manner which results in a conventional mode of operation of the computer system 100 known to those in the relevant art.

Typically, the application program of the preferred embodiment is resident on the hard disk drive 110, and read and controlled in its execution by the processor 105. Intermediate storage of the program may be accomplished using the semiconductor memory 106, possibly in concert with the hard disk drive 110. In some instances, the application program may be supplied to the user encoded on a CD-ROM or floppy disk and read via a CD-ROM drive (not illustrated) or floppy disk drive 111, or alternatively, in a case where the program is stored on tangible media connected to the network, may be read by the user from the tangible media on the network (not illustrated) via transmission by the modem device (not illustrated) or via transmission by a radio or infra-red transmission channel. The transmission may also include e-mail transmission. Still further, the software can also be loaded into the computer system 100 from other computer readable medium including magnetic tape, a ROM or integrated circuit, a magneto-optical disk, or a computer readable card such as a PCMCIA card. The foregoing is merely exemplary of relevant computer readable mediums. Other computer readable medium may be practiced without departing from the scope and spirit of the invention.

Having described the hardware environment of the invention, the method of determining whether two sets of simultaneous linear algebraic equations are equivalent will now be described.

Broad Outline of Method

Let S represent a system of simultaneous linear algebraic equations (SLAEs) as is given by the following:

$$e_{11}x_1+e_{12}x_2+e_{13}x_3+\ldots e_{1n}x_n=b_1$$

$$e_{21}x_1+e_{22}x_2+e_{23}x_3+\ldots e_{2n}x_n=b_2$$

$$\ldots$$

$$e_{n1}x_1+e_{n2}x_2+e_{n3}x_3+\ldots e_{nn}x_n=b_n$$

where n-unknowns $\{x_1,x_2,x_3,\ldots,x_n\}$ are related by n equations, and coefficients $e_{ij}$ (with $i=1,2,\ldots,n$ and $j=1,2,\ldots,n$) are known algebraic expressions, as are the right-hand side quantities $b_i$, $i=1,2,\ldots,n$.

The method of determining whether two such systems $S_1$ and $S_2$ are equivalent—that is, their respective solutions are identical to each other—broadly has two parts, namely:

(1) The reduction of each system of SLAEs S into a standard form of the type $$l_{11}x_1=r_1$$

$$l_{22}x_2=r_2$$

$$l_{33}x_3=r_3$$

$$\ldots$$

$$l_{nn}x_n=r_n$$

where $l_{ii}$ and $r_i$ are algebraic expressions; and (2) Comparison of two sets of SLAEs in their standard form.

It is assumed that the coefficients $e_{ij}$ and the quantities $b_i$ of the SLAEs $S_1$ and $S_2$ have no division operators. Undesirable division operators can be eliminated from the SLAEs $S_1$ and $S_2$ by multiplying the affected equations by appropriate factors. This is done to reduce the complexity of handling operands associated with the division operator, which is not a commutative operator.

Reduced Expression

The coefficients $e_{ij}$ and the quantities $b_i$ may be written as expressions, wherein the terms in the coefficients $e_{ij}$ and the quantities $b_i$ may include constants and variables. In the preferred embodiment, to facilitate comparisons between two expressions, the concept of a reduced form of an expression, as described below, has been used. The reduced expression is the canonical form to which expressions are converted.

It is apriori assumed that the expression to be converted is syntactically correct and does not contain any blanks. In the preferred embodiment, variables are limited in their construction to lower-case alphabets, underscore character, and digits, except that a variable may not start with a digit or end with an underscore. If these construction rules are not met, then the affected variables may be mapped (aliased) to alternative, but distinct, variables obeying the construction rules, and these new variables used instead.

A convention adopted for the present embodiment is that variables in the coefficients $e_{ij}$ and the quantities $b_i$ raised to a positive integer power are written out as multiplications of the variables. Thus, for example:

$a^n$ becomes a*a* . . . *a, where a appears n times in the product.

To convert a given expression into a reduced expression, the expression firstly is put in the following form:

<unitary operator><operand><operator><operand> . . . <operator><operand> where the unitary operator is either + (plus) or − (minus), and each operator is one of + (plus), − (minus), or * (multiplication). In the event that an expression does not commence with a unitary operator, a unitary operator + (plus) is inserted at the start of the expression. For example:

a+b*c−d becomes +a+b*c−d

Note, in particular, the absence of brackets. Brackets, if present in the expression, must be removed by carrying out the necessary operations needed to remove them, such as multiplying two parenthesized factors, discarding superfluous brackets, etc. to bring a given expression into the above form.

Next, all + (plus) operators are substituted with the string +1* so that + becomes +1*. Similarly, all − (minus) operators are substituted with the string −1* so that − becomes −1*. Thus, for example:

+a becomes +1*a and

−a*b becomes −1*a*b

Finally, the operands, which are constants (including the '1's introduced in the previous step) are converted into an e-format as follows:

".[unsigned number]e[e-sign][unsigned exponent]"

where:

[unsigned number] is a n-digited number comprising only digits and n is a prefixed integer greater than 0;

[e-sign] is the sign of the exponent and is one of > for plus or < for minus; and

[unsigned exponent] is a m-digited number comprising only digits and m is a prefixed integer greater than 0. Thus, for example:

$25=0.25*10^2$ becomes 0.250000e>02 and $0.025=0.25*10^{-1}$ becomes 0.250000e<01 where it is assumed n=6 and m=2. It is noted that any constant will be represented by a string of constant length m+n+3 characters in the e-format. Here e[e-sign][unsigned exponent] represents the quantity 10 raised to the power [e-sign][unsigned exponent], which must be multiplied to the number represented by .[unsigned number] to get the actual constant.

Now, the expression will contain at least one operand which is a constant. Each expression will have one or more terms, where each term has the following form:

<unitary operator><operand><*><operand> . . . <*><operand> where the unitary operator is either + (plus) or − (minus), and between two consecutive operands is the multiplication operator *. After the terms are identified, the [e-sign] of each constant is restored from < or > to − or + respectively.

In each term operands are sorted (rearranged) in ascending order according to their ASCII (American Standard Code for Information Interchange) value. This does not affect the term since the multiplication operator is a commutative operator, so the exchange of operands is completely permissible. The operands, which are constants, will all bunch up at the beginning of the terms where they can be easily identified and replaced by a single constant. Thus, for example:

+0.100000e+01*a*b*0.500000e+00 after arranging the operands in ascending order becomes

+0.100000e+01*0.500000e+00*a*b and after consolidating the constants the term becomes +0.500000e+00*a*b At this stage a term will have the following form:

<unitary operator><constant><*><operand> . . . <*><operand> where each operand is a variable, whose ASCII value is not lower than that of its preceding operand, if any. This is the reduced form of a term. In the reduced form, the non-constant part of a term is called a variable-group. For example, if the term in the reduced form is "+0.250000e+01*a*a*b", then its variable-group is "*a*a*b".

In an expression, all those terms whose variable-groups match, are combined by modifying the constant in one of the terms, and eliminating all other terms with identical variable-group.

Finally, the reduced terms in the expression are rearranged in an ascending order according to the ASCII value of their respective variable-group. In this final form, the expression is said to be in its reduced form. Note, in particular, that no two terms in a reduced expression will have the same variable-group.

Method of Determining Equivalence

Figure 2:
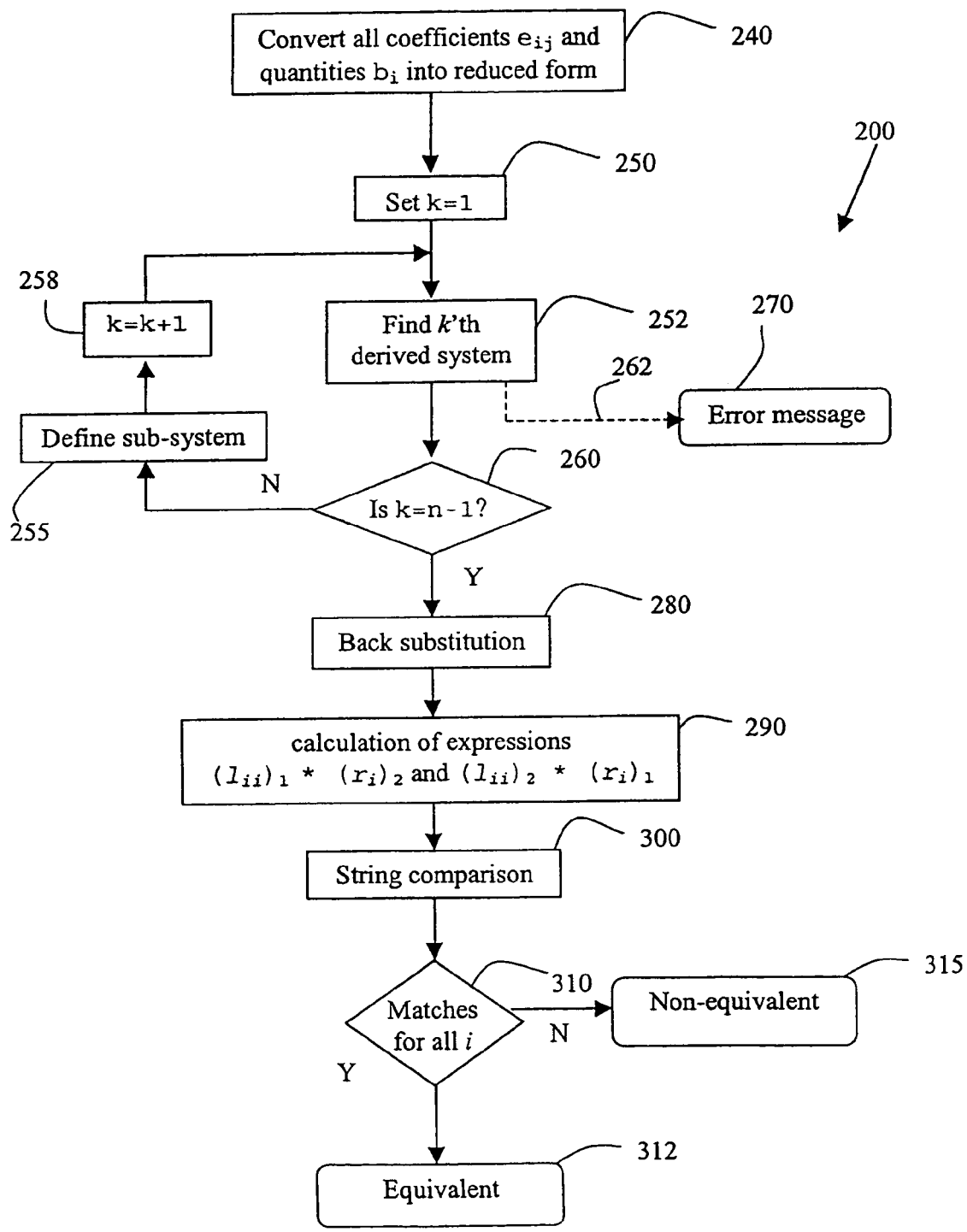
FIG. 2 is a flow diagram of a method of determining whether two sets of simultaneous linear algebraic equations are equivalent.

Referring to FIG. 2, a method 200 of determining whether two such systems $S_1$ and $S_2$ are equivalent is shown. Starting in step 240, all the coefficients $e_{ij}$ and the quantities $b_i$ are converted into their respective reduced form (as discussed above).

In steps 250 to 280, the Gaussian elimination and back substitution method (adapted to avoid divisions) is based to bring the SLAEs $S_1$ and $S_2$ into a standard form.

In step 250 a counter k is set to 1. Step 252 follows, where the variable $x_k$ is eliminated from the j-th equations, j=(k+1), . . . ,n, to get a k'th derived system. In particular, with counter k equal to 1, the variable $x_1$ is eliminated from the j-th equations, j=2,3, . . . ,n, to get a first derived system defined as:

$$e_{11}x_1 + e_{12}x_2 + e_{13}x_3 + \ldots + e_{1n}x_n = b_1$$

$${}^1e_{22}x_2 + {}^1e_{23}x_3 + \ldots + {}^1e_{2n}x_n = {}^1b_2$$

. . .

$${}^1e_{n2}x_2 + {}^1e_{n3}x_3 + \ldots + {}^1e_{nn}x_n = {}^1b_n$$

where the new coefficients $^1e_{jk}$ of the first derived system are given by:

$$^1e_{jk}=e_{jk}e_{11}-e_{1k}e_{j1};\text{ and}$$

$$^1b_j=b_je_{11}-b_1e_{j1},$$

for (j,k)=2, . . . ,n.

In a case where the coefficient $e_{11}=0$, then the first equation of the system S is interchanged with any other equation m of the system S for which its coefficient $e_{1m}$ is non-zero. If no such equation m can be found, then the SLAEs are singular, and the method 200, and in particular step 252, is interrupted by following the line 262 to step 270, where the method 200 is terminated with an appropriate error message.

In step 260 it is determined whether the counter k is equal to n−1, where n is the number of unknowns. If this is not so, a sub-system is defined in step 255 from the k'th derived system. For example, with counter k equal to 1, the sub-system derived from the first derived system is as follows:

$$^1e_{22}x_2+{}^1e_{23}x_3+\ldots+{}^1e_{2n}x_n={}^1b_2$$

. . .

$$^1e_{n2}x_2+{}^1e_{n3}x_3+\ldots+{}^1e_{nn}x_n={}^1b_n$$

This sub-system is a set of (n−1) SLAEs, having (n−1) unknowns $\{x_2,x_3,\ldots,x_n\}$. After incrementing the counter k in step 258, the steps of reduction 252 to 260 are now repeated on the sub-systems, until the system S is reduced to a (n−1)-th derived system as follows:

$$e_{11}x_1+e_{12}x_2+e_{13}x_3+\ldots+e_{1n}x_n=b_1$$

$$^1e_{22}x_2+{}^1e_{23}x_3+\ldots+{}^1e_{2n}x_n={}^1b_2$$

. . .

$$^{n-1}e_{nn}x_n={}^{n-1}b_n$$

wherein the diagonal coefficients $^{j-1}e_{jj}$, j=1, . . . ,n, are all nonzero, and where $$^le_{jk}={}^{l-1}e_{jk}{}^{l-1}e_{11}-{}^{l-1}e_{lk}{}^{l-1}e_{jl},$$

$$^lb_j={}^{l-1}b_j{}^{l-1}e_{11}-{}^{l-1}b_1{}^{l-1}e_{jl},$$

for l=1, . . . ,n−1; (j,k)=l+1, . . . ,n, and $$^0e_{jk}=e_{jk}.$$

This completes the Gaussian elimination phase of the process. Note the absence of any division in the entire process. The counter k is now equal to n−1 and the method therefore continues to step 280 where back substitution is performed, again without any division. Therefore, instead of calculating the unknown $x_i$, the product $l_{ii}x_i$ is calculated, where each of the n unknowns $x_i$ is expressed in the form of a ratio $x_i=r_i/l_{ii}$ with $r_i$ a numerator and $l_{ii}$ a denominator. With i=n, we have, $$^{n-1}e_{nn}x_n={}^{n-1}b_n$$

so that $$l_{nn}={}^{n-1}e_{nn}$$

and $$r_n={}^{n-1}b_n.$$

For i=n−1, the (n−1)-th equation is multiplied by the denominator $l_{nn}$ to obtain $$l_{nn}{}^{n-2}e_{n-1,n-1}x_{n-1}+l_{nn}{}^{n-2}e_{n-1,n}x_n={}^{n-2}b_{n-1}l_{nn}$$

or $$l_{nn}{}^{n-2}e_{n-1,n-1}x_{n-1}={}^{n-2}b_{n-1}l_{nn}-{}^{n-2}e_{n-1,n}r_n$$

so that $$l_{n-1,n-1}=l_{nn}{}^{n-2}e_{n-1,n-1}$$

and $$r_{n-1}={}^{n-2}b_{n-1}l_{nn}-{}^{n-2}e_{n-1,n}r_n$$

For i=n−2, we multiply the (n−2)-th equation by the denominator $l_{n-1,n-1}$ and obtain $$l_{n-1,n-1}{}^{n-3}e_{n-2}x_{n-2}+l_{n-1,n-1}{}^{n-3}e_{n-2,n-1}x_{n-1}+l_{n-1,n-1}{}^{n-3}e_{n-2,n}x_n={}^{n-3}b_{n-2}l_{n-1,n-1}$$

or $$l_{n-1,n-1}{}^{n-3}e_{n-2,n-2}x_{n-2}={}^{n-3}b_{n-2}l_{n-1,n-1}-{}^{n-2}e_{n-1,n-1}{}^{n-3}e_{n-2,n}r_n-{}^{n-3}e_{n-2,n-1}r_{n-1}$$

so that $$l_{n-2,n-2}=l_{n-1,n-1}{}^{n-3}e_{n-2,n-2}$$

and $$r_{n-2}={}^{n-3}b_{n-2}l_{n-1,n-1}-{}^{n-2}e_{n-1,n-1}{}^{n-3}e_{n-2,n}r_n-{}^{n-3}e_{n-2,n-1}r_{n-1}$$

It can be shown that for any i=1,2, . . . ,n−1, the result will be $$l_{ii}=l_{i+1,i+1}{}^{i-1}e_{ii}$$

and $$r_i={}^{i-1}b_il_{i+1,i+1}-R_{in}r_n-R_{i,n-1}r_{n-1}-\ldots-R_{i,i+1}r_{i+1}$$

with $$l_{nn}={}^{n-1}e_{nn}$$

and $$r_n={}^{n-1}b_n$$

where $$R_{ij}=(l_{i+1,i+1}/l_{jj})^{i-1}e_{ij}$$

for j=n, . . . ,(i+1) and i=1,2, . . . ,n−1.

Note that since $l_{jj}$ is a factor of $l_{i+1,i+1}$, $R_{ij}$ will be free of any divisions. However, it is noted that there is no step in the back substitution step 280 where factors common to $l_{ii}$ and $r_i$ have been eliminated.

After completing steps 240 to 280 for each of the two SLAEs systems $S_1$ and $S_2$, string arrays $(l_{ii})_1$ and $(r_i)_1$ for system $S_1$ and $(l_{ii})_2$ and $(r_i)_2$ for system $S_2$ have been produced. In principle, to show that the solutions of the two systems $S_1$ and $S_2$ are equivalent, it would suffice if their respective string arrays $l_{ii}$ and $r_i$ where shown to match. However, this can not always be done, since it is generally not possible to eliminate their common factors completely by presently known methods. It must therefore be assumed that there may be uneliminated common factors present. However, it is clear that mathematically $$(l_{ii}/r_i)_1=(l_{ii}/r_i)_2$$

or equivalently, $$(l_{ii})_1*(r_i)_2=(l_{ii})_2*(r_i)_1$$

in which form a comparison may be performed. Therefore, step 290 calculates expressions $(l_{ii})_1*(r_i)_2$ and $(l_{ii})_2*(r_i)_1$ for each i=1, . . . ,n. If all the expressions $(l_{ii})_1*(r_i)_2$ and $(l_{ii})_2*(r_i)_1$ have been consistently reduced to their reduced form, then a step 300 performs a simple string comparison of $(l_{ii})_1*(r_i)_2$ with $(l_{ii})_2*(r_i)_1$. A decision step 310 determines whether matches were found for all i=1, . . . ,n. If the answer is Yes, then equivalence of systems $S_1$ and $S_2$ is reported in step 312. Alternatively, non-equivalence is reported in step 315.

EXAMPLE

An example of performing the method 200 to determine whether two systems $S_1$ and $S_2$ are equivalent, will now be described. C and C++ programing language notations will be used. In this notation, the coefficients $e_{ij}$ and the quantities $b_i$ are denoted as e[i−1][j−1] and b[i−1] respectively.

To understand the example given below, reference to the following pseudo-code fragment will be helpful. The variables e[ ][ ] and b[ ] are assumed to have the datatype algebraic "expression", which inter alia will implement the operators '+' (plus), '−' (minus), and '*' (multiplication) operators on such expressions. The class "expression" also has a method which can convert an algebraic expression into its reduced form.

```
// Gaussian elimination
// e[ ][ ] and b[ ] are of type Expression.
for (i=0; i<n−1; i++) {// Index for the derived system.
  // - - - Comment 1 - - -
  // If e[i][i]=0, exchange this row with another below it (say
  // the k-th row, k>i) such that e[i][k] !=0. If no such k is
  // found, exit with the message that the matrix e is singular.
  // The code to do this is not shown here.
  for (j=i+1; j<n; j++) {
    for (k=i+1; k<n; k++) {
      // Multiply i-th row with e[j][i].
      // Multiply j-th row with e[i][i].
      // Subtract i-th row from j-th row.
      e[j][k]=e[j][k]*e[i][i]−e[i][k]*e[j][i];
    }
    b[j]=b[j]*e[i][i]−b[i]*e[j][i];
  }
  // Zero lower triangle coefficients
  for (k=0; k<i; k++) e[i][k]="0";
}
// Back-substitute.
i=n;
// At the end of the following while loop, e[i−1][i−1] will
// contain $l_{ii}$
// and b[i−1] will contain $r_i$. The solution will be $x_i=l_{ii}/r_i$.
while (i − −) {
  j=n;
    while (j − −) b[j]=b[j]*e[i][i]−b[i]*e[j][i];
    for (k=0; k<n; k++) {
      for (j=k; j<n; j++) {
        e[k][j]*=e[i][i];
      }
    }
}
```

Now, let system $S_1$ be the set of equations:

$ax_1+x_2+x_3=a+2$ $x_1+x_2+x_3=3$ $x_1+x_2-x_3=1$ and let system $S_2$ be the set of equations $ax_1+2x_2=a+2$ $2x_1+2x_2=4$ $x_2-x_3=0$ That is, each set consists of three equations.

Considering system $S_1$ first, the coefficients $e_{ij}$ and the quantities $b_i$ may be written as follows:

e[0][0]=a e[0][1]=1 e[0][2]=1 b[0]=a+2 e[1][0]=1 e[1][1]=1 e[1][2]=1 b[1]=3 e[2][0]=1 e[2][1]=1 e[2][2]=−1 b[2]=1

Performing step 240 in system $S_1$, all the terms in the coefficients $e_{ij}$ and the quantities $b_i$ are converted by the computer program performing method 200 into the reduced form, with the text variable to which a pseudocode variable refers to at different stages of computation noted on the right hand side, as follows:

| Reduced Form | Variables |
| --- | --- |
| e[0][0] = +.10000e+01*a | $^0e_{11} = e_{11}$ |
| e[0][1] = +.10000e+01 | $^0e_{12} = e_{12}$ |
| e[0][2] = +.10000e+01 | $^0e_{13} = e_{13}$ |
| b[0] = +.10000e+01*a+.20000e+01 | $^0b_1 = b_1$ |
| e[1][0] = +.10000e+01 | $^0e_{21} = e_{21}$ |
| e[1][1] = +.10000e+01 | $^0e_{22} = e_{22}$ |
| e[1][2] = +.10000e+01 | $^0e_{23} = e_{23}$ |
| b[1] = +.30000e+01 | $^0b_2 = b_2$ |
| e[2][0] = +.10000e+01 | $^0e_{31} = e_{31}$ |
| e[2][1] = +.10000e+01 | $^0e_{32} = e_{32}$ |
| e[2][2] = −.10000e+01 | $^0e_{33} = e_{33}$ |
| b[2] = +.10000e+01 | $^0b_3 = b_3$ |

With counter k set to 1 in step 250, a first derived system is found by performing step 252, thereby eliminating the variable $x_1$ from equations 2 and 3. The coefficients $^1e_{ij}$ and the quantities $^1b_i$ of the first derived system are as follows:

| Reduced Form | Variables |
|---|---|
| e[0][0] = +.10000e+01*a | $^0e_{11}$ |
| e[0][1] = +.10000e+01 | $^0e_{12}$ |
| e[0][2] = +.10000e+01 | $^0e_{13}$ |
| b[0] = +.10000e+01*a+.20000e+01 | $^0b_1$ |
| e[1][0] = +.00000e+00 | $^1e_{21}$ |
| e[1][1] = −.10000e+01+.10000e+01*a | $^2e_{22}$ |
| e[1][2] = −.10000e+01+.10000e+01*a | $^1e_{23}$ |
| b[1] = −.20000e+01+.20000e+01*a | $^1b_2$ |
| e[2][0] = +.00000e+00 | $^1e_{31}$ |
| e[2][1] = −.10000e+01+.10000e+01*a | $^1e_{32}$ |
| e[2][2] = −.10000e+01−.10000e+01*a | $^1e_{33}$ |
| b[2] = −.20000e+01 | $^1b_3$ |

The above first derived system for system $S_1$, when written in normal algebraic form, appears as:

$$ax_1+x_2+x_3=a+2$$

$$(a-1)x_2+(a-1)x_3=2(a-1)$$

$$(a-1)x_2-(a-1)x_3=-2$$

By repeating steps 250 to 260, the method 200 calculates the second derived system for system $S_1$ as follows:

| Reduced Form | Variables |
|---|---|
| e[0][0] = +.10000e+01*a | $^0e_{11}$ |
| e[0][1] = +.10000e+01 | $^1e_{12}$ |
| e[0][2] = +.10000e+01 | $^0e_{13}$ |
| b[0] = +.10000e+01*a+.20000e+01 | $^0b_1$ |
| e[1][0] = +.00000e+00 | $^1e_{21}$ |
| e[1][1] = −.10000e+01+.10000e+01*a | $^1e_{22}$ |
| e[1][2] = −.10000e+01+.10000e+01*a | $^1e_{23}$ |
| b[1] = −.20000e+01+.20000e+01*a | $^1b_2$ |
| e[2][0] = +.00000e+00 | $^2e_{31}$ |
| e[2][1] = +.00000e+00 | $^2e_{32}$ |
| e[2][2] = +.20000e+01*a−.20000e+01*a*a | $^2e_{33} = l_{33}$ |
| b[2] = +2.0000e+00*a−2.0000e+00*a*a | $^2b_3 = r_3$ | or alternatively $$ax_1+x_2+x_3=a+2$$

$$(a-1)x_2+(a-1)x_3=2(a-1)$$

$$-2a(a-1)x_3=-2a(a-1)$$

Performing the back substitution step 280 the numerators $r_i$ and the denominators $l_{ii}$ can be found. In particular, from the last equation of the second derived system the numerator $r_3$ and the denominator $l_{33}$ are as follows:

$$l_{33}=-2a(a-1)$$

and $$r_3=-2a(a-1).$$

Substituting numerator $r_3$ and denominator $l_{33}$ into the second equation, we get:

| Reduced Form | Variables |
|---|---|
| e[1][1] = −.20000e+01*a+.40000e+01*a*a−.20000e+01*a*a*a | $l_{22}$ |
| b[1] = −.20000e+01*a+.40000e+01*a*a−.20000e+01*a*a*a | $r_2$ | or $$l_{22}=-2a(1-2a+a^2)$$

and $$r_2=-2a(1-2a+a^2).$$

In the final back substitution we get

| Reduced Form | Variables |
|---|---|
| e[0][0] = −.40000e+01*a*a*a+.12000e+02*a*a*a*a−.12000e+02*a*a*a*a*a+.40000e+01*a*a*a*a*a*a | $l_{11}$ |
| b[0] = −.40000e+01*a*a*a+.12000e+02*a*a*a*a−.12000e+02*a*a*a*a*a+.40000e+01*a*a*a*a*a*a | $r_1$ | producing thereby $$l_{11}=-4a^3(1-3a+3a^2-a^3)$$

and $$r_1=-4a^3(1-3a+3a^2-a^3).$$

In a similar manner, the first derived system of system $S_2$ may be written as follows:

| Reduced Form | Variables |
|---|---|
| e[0][0] = +.10000e+01*a | $^0e_{11}$ |
| e[0][1] = +.20000e+01 | $^0e_{12}$ |
| e[0][2] = +.00000e+00 | $^0e_{13}$ |
| b[0] = +.10000e+01*a.20000e+01 | $^0b_1$ |
| e[1][0] = +.00000e+00 | $^1e_{21}$ |
| e[1][1] = −.40000e+01+.20000e+01*a | $^1e_{22}$ |
| e[1][2] = +.00000e+00 | $^1e_{23}$ |
| b[1] = −.40000e+01+.20000e+01*a | $^1b_2$ |
| e[2][0] = +.00000e+00 | $^1e_{31}$ |
| e[2][1] = +.10000e+01*a | $^1e_{32}$ |
| e[2][2] = −.10000e+01*a | $^1e_{33}$ |
| b[2] = +.00000e+00 | $^1b_3$ | or $$ax_1+2x_2=a+2$$

$$2(a-2)x_2=2(a-2)$$

$$ax_2-ax_3=0$$

The second derived system for system $S_2$ is as follows:

| Reduced Form | Variables |
|---|---|
| e[0][0] = +.10000e+01*a | $^0e_{11}$ |
| e[0][1] = +.20000e+01 | $^1e_{12}$ |
| e[0][2] = +.00000e+00 | $^0e_{13}$ |
| b[0] = +.10000e+01*a+.20000e+01 | $^0b_1$ |
| e[1][0] = +.00000e+00 | $^1e_{21}$ |
| e[1][1] = −.40000e+01+.20000e+01*a | $^1e_{22}$ |
| e[1][2] = −.00000e+00 | $^1e_{23}$ |
| b[1] = −.40000e+01+.20000e+01*a | $^1b_2$ |
| e[2][0] = +.00000e+00 | $^2e_{31}$ |
| e[2][1] = +.10000e+01*a | $^2e_{32}$ |
| e[2][2] = +.40000e+01*a−.20000e+01*a*a | $^2e_{33} = l_{33}$ |
| b[2] = +4.0000e+00*a−2.0000e+01*a*a | $^2b_3 = r_3$ | or $$ax_1+2x_2=a+2$$

$$2(a-2)x_2=2(a-2)$$

$$2a(2-a)x_3=2a(2-a)$$

Again performing the back substitution step 280 with system $S_2$ the numerators $r_i$ and the denominators $l_{ii}$ can be found. The numerator $r_3$ and the denominator $l_{33}$ are as follows:

$$l_{33}=2a(2-a)$$

and $$r_3=2a(2-a).$$

Substituting numerator $r_3$ and denominator $l_{33}$ into the second equation, we get:

| Reduced Form | Variables |
|---|---|
| e[1][1] = −.16000e+02*a+.16000e+02a*a−.40000e+01*a*a*a | $l_{22}$ |
| b[1] = −.16000e+02*a+.16000e+02*a*a−.40000e+01*a*a*a | $r_2$ | or $$l_{22}=-4a(4-4a+a^2)$$

and $$r_2=-4a(4-4a+a^2).$$

In the final back substitution we get

| Reduced Form | Variables |
|---|---|
| e[0][0] = −.64000e+02*a*a+.96000e+02*a*a*a−.48000e+02*a*a*a*a+.80000e+01*a*a*a*a*a | $l_{11}$ |
| b[0] = −.64000e+02*a*a+.96000e+02*a*a*a−.48000e+02*a*a*a*a +.80000e+01*a*a*a*a*a | $r_1$ | or $$l_{11}=-8a^3(8-12a+6a^2-a^3)$$

and $$r_1=-8a^3(8-12a+6a^2-a^3).$$

Performing step 290, the expressions $(l_{ii})_1*(r_i)_2$ and $(l_{ii})_2*(r_i)_1$ are calculated and reduced to their reduced forms. For example, calculating $(l_{22})_1*(r_2)_2$ gives the following:

$(l_{22})_1*(r_2)_2=(-0.20000e+01*a+0.40000e+01*a*a-$
  $0.20000e+01*a*a*a)*(-0.16000e+02*a+$
  $0.16000e+02*a-0.40000e+01*a*a*a)$ $=+0.32000e+02*a*a-0.32000e+02*a*a*a+$
  $0.80000e+01*a*a*a-0.64000e+02*a*a*a+$
  $0.64000e+02*a*a*a-0.16000e+$
  $02*a*a*a*a+0.32000e+02*a*a*a*a-$
  $0.32000e+02*a*a*a*a+0.80000e+$
  $01*a*a*a*a*a$ $=+0.32000e+02*a*a-0.96000e+02*a*a*a+$
  $0.10400e+03*a*a*a*a-0.48000e+$
  $02*a*a*a*a*a+0.80000e+01*a*a*a*a*a$

Similarly, calculating $(l_{22})_2*(r_2)_1$ gives the following:

$(l_{22})_2*(r_2)_1=(-0.16000e+02*a+0.16000e+02*a*a-$
  $0.40000e+01*a*a*a)*(-0.20000e+01*a+$
  $0.40000e+01*a*a-0.20000e+01*a*a*a)$ $=+0.32000e+02*a*a-0.64000e+02*a*a*a+$
  $0.32000e+02*a*a*a*a-0.32000e+02*a*a*a+$
  $0.64000e+02*a*a*a*a-0.32000e+$
  $02*a*a*a*a*a+0.80000e+01*a*a*a*a-$
  $0.16000e+02*a*a*a*a*a+0.80000e+$
  $01*a*a*a*a*a$ $=+0.32000e+02*a*a-0.96000e+02*a*a*a+$
  $0.10400e+03*a*a*a*a-0.48000e+$
  $02*a*a*a*a*a+0.80000e+01*a*a*a*a*a$

Step 290 similarly calculates the expressions $(l_{ii})_1*(r_i)_2$ and $(l_{ii})_2*(r_i)_1$ for i=1 and i=3. A simple string comparison of $(l_{22})_1*(r_2)_2$ with $(l_{22})_2*(r_2)_1$, performed in step 300, shows that these expressions match. By repeating the comparison of $(l_{ii})_1*(r_i)_2$ with $(l_{ii})_2*(r_i)_1$ for i=1 and i=3, and finding that the expressions match for each i=1, 2 and 3, it can be shown that system $S_1$ is equivalent to system $S_2$.

Embodiments of the invention can be implemented within compilers, for example. As is well known, a compiler generates machine executable object code from high-level source code, written in languages such as C++.

The foregoing describes only some embodiments of the present invention and modifications and/or changes can be made thereto without departing from the scope and spirit of the invention, the embodiments being illustrative and not restrictive. For example, the equivalence of more than two sets of simultaneous linear algebraic equations may be determined by pair-wise comparing the sets for equivalence.

I claim:

1. A computer implemented method in a simulation of a physical system, wherein the system is described by a first set of simultaneous linear algebraic equations and is simulated by a second system described by a second set of simultaneous linear algebraic equations, each of said equations being of a form:

$$e_{i1}x_1+e_{i2}x_2+e_{i3}x_3+\ldots+e_{in}x_n=b_i$$

wherein $x_j$ are unknowns, $e_{ij}$ are coefficients, and $b_i$ are quantities, said coefficients and quantities being known algebraic expressions, said method comprising the steps of:
  a) iteratively eliminating said unknowns from each of said sets of simultaneous linear algebraic equations, wherein certain variables in the coefficients $e_{ij}$ and the quantities $b_i$ of such an equation are raised to a positive integer power u, and step a) includes the following substeps for each of the equations:
    a1) arranging those certain variables as u instances of the variables, each instance being raised to a power of 1 and all the instances being multiplied together;
    a2) arranging expressions of such an equation resulting from substep a1) in a form <unitary operator><operand><operator><operand> . . . <operator><operand>, where the unitary operator is either + or −, and each operator is one of +, −, or *, including inserted a unitary operator in front of the expression if an expression does not already commence the unitary operator;
    a3) removing brackets of expressions of such an equation resulting from substep a2), by performing operations to render brackets superfluous, including multiplying terms inside and outside brackets, and discarding resulting superfluous brackets;

a4) substituting operators of expressions of such an equation resulting from substep a3), wherein the substituting of the operators substitutes all + operators with a string +1* and all − operators with a string −1*;

a5) converting numerical terms of expressions of such an equation resulting from substep a4) into an exponential format .[unsigned number]e[e-sign][unsigned exponent], wherein e[e-sign][unsigned exponent] for a numerical term represents a quantity 10 raised to a power [e-sign][unsigned exponent] multiplied by a number represented by .[unsigned number], such that .[unsigned number]e[e-sign][unsigned exponent] equals the numerical term, [unsigned number] being an n-digited number comprising only digits, n being a prefixed integer greater than 0, [e-sign] being a sign of the exponent, [unsigned exponent] being an m-digited number, m being a prefixed integer greater than 0;

a6) sorting operands of terms in expressions of such an equation resulting from substep a5), wherein the sorting of the operands arranges the operands into ascending order according to a certain standardized value sequence;

a7) combining terms of expressions of such an equation resulting from substep a6) having matching variable-groups, wherein the combining of the terms includes combining the matching variable-group terms into a single term; and a8) rearranging terms of expressions of such an equation resulting from substep a7), wherein the rearranging of the terms arranges the terms into an ascending order according to values of their respective variable-groups, wherein substeps a1) through a8) reducing such an equation to a form:

$$(l_{ij})_k x_i = (r_i)_k$$

wherein $l_{ij}$ and $r_i$ are algebraic expressions, and k={1;2} indicate one of said sets that said equation is derived from; and b) comparing, for each of said unknowns, a first product $(l_{ii})_1 * (r_i)_2$ and a second product $(l_{ii})_2 * (r_i)_1$, wherein the first product is an algebraic expression and the second product is an algebraic expression, and wherein if said products match for all said unknowns said second set of simultaneous linear algebraic equations is equivalent to the first set of simultaneous linear algebraic equations and thereby is determined to be a proper representation of the physical system, wherein the eliminating said unknowns in step a) enables the comparing in step b) to determine if the products match without determining numerical values for the unknowns and without performing a matrix inversion.

2. The computer implemented method according to claim 1, said method further including the initial steps of:
recasting said algebraic expressions into a form of one or more token pairs arranged sequentially in a string, each said token pair comprising an operator followed by an operand,
wherein step a) reduces the strings to the form $(l_{ii})_k x_i = (r_i)_k$ in accordance with a set of predetermined operations.

3. The method according to claim 2, wherein the reducing of the strings to the form $(l_{ii})_k x_i = (r_i)_k$ comprises the steps of:
arranging the token pairs into subgroups.

4. A computational apparatus for use in simulating a physical system, wherein the system is described by a first set of simultaneous linear algebraic equations and is simulated by a second system described by a second set of simultaneous linear algebraic equations, each of said equations being of a form:

$$e_{i1}x_1 + e_{i2}x_2 + e_{i3}x_3 + \ldots + e_{in}x_n = b_i$$

wherein $x_j$ are unknowns, $e_{ij}$ are coefficients, and $b_i$ are quantities, said coefficients and quantities being known algebraic expressions, said apparatus comprising:

eliminating means for iteratively eliminating said unknowns from each of said sets of simultaneous linear algebraic equations, wherein certain variables in the coefficients $e_{ij}$ and the quantities $b_i$ of such an equation are raised to a positive integer power u, and the eliminating means includes:

a1) first arranging means for arranging those certain variables as u instances of the variables, each instance being raised to a power of 1 and all the instances being multiplied together;

a2) second arranging means for arranging expressions of such an equation from the first arrangement means in a form <unitary operator><operand><operator><operand> . . . <operator><operand>, where the unitary operator is either + or −, and each operator is one of +, −, or *, including inserted a unitary operator in front of the expression if an expression does not already commence the unitary operator;

a3) removing means for removing brackets of expressions of such an equation from the second arranging means, by performing operations to render brackets superfluous, including multiplying terms inside and outside brackets, and discarding resulting superfluous brackets;

a4) substituting means for substituting operators of expressions of such an equation from the removing means, wherein the substituting of the operators substitutes all + operators with a string +1* and all − operators with a string −1*;

a5) converting means for converting numerical terms of expressions of such an equation from the substituting means into an exponential format .[unsigned number]e[e-sign][unsigned exponent], wherein e[e-sign][unsigned exponent] for a numerical term represents a quantity 10 raised to a power [e-sign][unsigned exponent] multiplied by a number represented by .[unsigned number], such that .[unsigned number]e[e-sign][unsigned exponent] equals the numerical term, [unsigned number] being an n-digited number comprising only digits, n being a prefixed integer greater than 0, [e-sign] being a sign of the exponent, [unsigned exponent] being an m-digited number, m being a prefixed integer greater than 0;

a6) sorting means for sorting operands of terms in expressions of such an equation from the converting means, wherein the sorting of the operands arranges the operands into ascending order according to a certain standardized value sequence;

a7) combining means for combining terms of expressions of such an equation from the sorting means having matching variable-groups, wherein the combining of the terms includes combining the matching variable-group terms into a single term; and a8) third rearranging means for rearranging terms of expressions of such an equation from the combining means, wherein the rearranging of the terms arranges the terms into an ascending order according to values of their respective variable-groups, wherein substeps a1) through a8) reduce such an equation to a form:

$$(l_{ij})_k x_i = (r_i)_k$$

wherein $l_{ij}$ and $r_i$ are algebraic expressions and not solely numerical values, and k={1;2} indicate one of said sets that said equation is derived from; and comparing means for comparing, for each of said unknowns, a first product $(l_{ii})_1 * (r_i)_2$ and a second product $(l_{ii})_2 * (r_i)_1$, wherein the first product is an algebraic expression and the second product is an algebraic expression, and wherein if said products match for all said unknowns said second set of simultaneous linear algebraic equations is equivalent equivalent to the first set of simultaneous linear algebraic equations and thereby is a proper representation of the physical system, wherein the eliminating said unknowns by the eliminating means enables the comparing means to determine if the products match without determining numerical values for the unknowns and without performing a matrix inversion.

5. The computational apparatus according to claim 4, said apparatus further including:

means for recasting said algebraic expressions into a form of one or more token pairs arranged sequentially in a string, each said token pair comprising an operator followed by an operand, wherein said eliminating means reduces the strings to the form $(l_{ij})_k x_i = (r_i)_k$ in accordance with a set of predetermined operations.

6. The apparatus according to claim 5, wherein the reducing of the strings to the form $(l_{ij})_k x_i = (r_i)_k$ comprises:

arranging the token pairs into subgroups.

7. A computer program product carried by a storage medium, the computer program product being for use in a simulation of a physical system, wherein the system is described by a first set of simultaneous linear algebraic equations and is simulated by a second system described by a second set of simultaneous linear algebraic equations, each of said equations being of a form:

$$e_{i1}x_1 + e_{i2}x_2 + e_{i3}x_3 + \ldots + e_{in}x_n = b_i$$

wherein $x_j$ are unknowns, $e_{ij}$ are coefficients, and $b_i$ are quantities, said coefficients and quantities being known algebraic expressions, said computer program product comprising:

an eliminating program element for iteratively eliminating said unknowns from each of said sets of simultaneous linear algebraic equations, wherein certain variables in the coefficients $e_{ij}$ and the quantities $b_i$ of such an equation are raised to a positive integer power u, and the eliminating program element includes the following program subelements:

a1) first arranging program subelement for arranging those certain variables as u instances of the variables, each instance being raised to a power of 1 and all the instances being multiplied together;

a2) second arranging program subelement for arranging expressions of such an equation from first arranging program subelement in a form <unitary operator><operand><operator><operand> . . . <operator><operand>, where the unitary operator is either + or −, and each operator is one of +, −, or *, including inserted a unitary operator in front of the expression if an expression does not already commence the unitary operator;

a3) removing program subelement for removing brackets of expressions of such an equation from the second arranging program subelement, by performing operations to render brackets superfluous, including multiplying terms inside and outside brackets, and discarding resulting superfluous brackets;

a4) substituting program subelement for substituting operators of expressions of such an equation from the removing program subelement wherein the substituting of the operators substitutes all + operators with a string +1* and all − operators with a string −1*;

a5) converting program subelement for converting numerical terms of expressions of such an equation from the substituting program subelement into an exponential format .[unsigned number]e[e-sign][unsigned exponent], wherein e[e-sign][unsigned exponent] for a numerical term represents a quantity 10 raised to a power [e-sign][unsigned exponent] multiplied by a number represented by .[unsigned number], such that .[unsigned number]e[e-sign][unsigned exponent] equals the numerical term, [unsigned number] being an n-digited number comprising only digits, n being a prefixed integer greater than 0, [e-sign] being a sign of the exponent, [unsigned exponent] being an m-digited number, m being a prefixed integer greater than 0;

a6) sorting program subelement for sorting operands of terms in expressions of such an equation from the converting program subelement, wherein the sorting of the operands arranges the operands into ascending order according to a certain standardized value sequence;

a7) combining program subelement for combining terms of expressions of such an equation from the sorting program subelement having matching variable-groups, wherein the combining of the terms includes combining the matching variable-group terms into a single term; and a8) third rearranging program subelement for rearranging terms of expressions of such an equation from the combining program subelement, wherein the rearranging of the terms arranges the terms into an ascending order according to values of their respective variable-groups, wherein substeps a1) through a8) reduce such an equation to a form:

$$(l_{ij})_k x_i = (r_i)_k$$

wherein $l_{ij}$ and $r_i$ are algebraic expressions and not solely numerical values, and k={1;2} indicate one of said sets that said equation is derived from; and a comparing program element for comparing, for each of said unknowns, a first product $(l_{ii})_1 * (r_i)_2$ and a second product $(l_{ii})_2 * (r_i)_1$, wherein the first product is an algebraic expression and the second product is an algebraic expression, and wherein if said products match for all said unknowns said second set of simultaneous linear algebraic equations is equivalent to the first set of simultaneous linear algebraic equations, and thereby is a proper representation of the physical system, wherein the eliminating said unknowns by the eliminating program element enables the comparing by the comparing program element to determine if the products match without determining numerical values for the unknowns and without performing a matrix inversion.

8. The computer program of claim 7 further comprising:
a program element for recasting said algebraic expressions into a form of one or more token pairs arranged sequentially in a string, each said token pair comprising an operator followed by an operand, wherein said eliminating program element reduces the strings to the form $(l_{ij})_k x_i = (r_i)_k$ in accordance with a set of predetermined operations.

9. The computer program of claim 8, wherein the reducing of the strings to the form $(l_{ij})_k x_i = (r_i)_k$ comprises:
arranging the token pairs into subgroups.

* * * * *

UNITED STATES PATENT AND TRADEMARK OFFICE
CERTIFICATE OF CORRECTION

PATENT NO. : 7,043,510 B1
APPLICATION NO. : 09/597478
DATED : May 9, 2006
INVENTOR(S) : Rajendra Kumar Bera It is certified that error appears in the above-identified patent and that said Letters Patent is hereby corrected as shown below:

The 27th line of column 4, as set out in the printed patent, which reads "$e_{11}x_1+e_{12}x_2+e_{13}x_3+ \ldots e_{1n}x_n=b_1$" should read -- $e_{11}x_1+e_{12}x_2+e_{13}x_3+ \ldots +e_{1n}x_n=b_1$ --.

The 29th line of column 4, as set out in the printed patent, which reads "$e_{21}x_1+e_{22}x_2+e_{23}x_3+ \ldots e_{2n}x_n=b_2$" should read -- $e_{21}x_1+e_{22}x_2+e_{23}x_3+ \ldots +e_{2n}x_n=b_2$ --.

The 32nd line of column 4, as set out in the printed patent, which reads "$e_{n1}x_1+e_{n2}x_2+e_{n3}x_3+ \ldots e_{nn}x_n=b_n$" should read -- $e_{n1}x_1+e_{n2}x_2+e_{n3}x_3+ \ldots +e_{nn}x_n=b_n$ --.

The 50th line of column 4, as set out in the printed patent, which reads ". . . where $1_{ii}$ and $r_i$ are algebraic expressions . . ." should read -- where $l_{ii}$ and $r_i$ are algebraic expressions . . . --

The 10th line of column 6, as set out in the printed patent, which reads "In each term operands are sorted (rearranged) in ascending order . . ." should read -- In each term the operands are sorted (rearranged) in ascending order . . . --.

The 3rd line of column 7, as set out in the printed patent, which reads "$^1e_{jk}=e_{jk}e_{11}-e_{1k}e_{j1}$;and" should read -- $^1e_{jk}=e_{jk}e_{11}-e_{1k}e_{j1}$; and --.

The 5th line of column 7, as set out in the printed patent, which reads "$^1b_j=b_je_{11}-b_1e_{j1}$," should read -- $^1b_j=b_je_{11}-b_1e_{j1}$, --.

The 42nd line of column 7, as set out in the printed patent, which reads "$^le_{jk}={}^{l-1}e_{jk}{}^{l-1}e_{11}-{}^{l-1}e_{lk}{}^{l-1}e_{j1}$," should read -- $^le_{jk}={}^{l-1}e_{jk}{}^{l-1}e_{ll}-{}^{l-1}e_{lk}{}^{l-1}e_{jl}$, --.

The 44th line of column 7, as set out in the printed patent, which reads "$^lb_j={}^{l-1}b_j{}^{l-1}e_{11}-{}^{l-1}l_1{}^{l-1}e_{jl}$," should read -- $^lb_j={}^{l-1}b_j{}^{l-1}e_{ll}-{}^{l-1}b_l{}^{l-1}e_{jl}$, --.

The 46th line of column 7, as set out in the printed patent, which reads "for l=1, . . . , n-1; (j,k)=l+1, . . . ,n," should read -- for $l=1, \ldots ,n-1; (j,k)=l+1, \ldots , n$, --.

The 56th line of column 7, as set out in the printed patent, which reads ". . . calculating the unknown $x_i$, the product $1_{ii}x_i$ is calculated, . . ." should read -- . . . calculating the unknown $x_i$, the product $l_{ii}x_i$ is calculated, . . . --.

The 58th line of column 7, as set out in the printed patent, which reads ". . . a ratio $x_i=r_i/1_{ii}$ with $r_i$ a numerator and $1_{ii}$ a denominator. With . . ." should read -- . . . a ratio $x_i=r_i/l_{ii}$ with $r_i$ a numerator and $l_{ii}$ a denominator. With . . . --.

UNITED STATES PATENT AND TRADEMARK OFFICE
CERTIFICATE OF CORRECTION

PATENT NO.       : 7,043,510 B1
APPLICATION NO.  : 09/597478
DATED            : May 9, 2006
INVENTOR(S)      : Rajendra Kumar Bera It is certified that error appears in the above-identified patent and that said Letters Patent is hereby corrected as shown below:

The 63$^{rd}$ line of column 7, as set out in the printed patent, which reads "$l_{nn}=^{n-1}e_{nn}$" should read -- $l_{nn}=^{n-1}e_{nn}$ --.

The 49$^{th}$ line of column 8, as set out in the printed patent, which reads "Note that since $l_{jj}$ is a factor of $l_{i+1,i+1}$, $R_{ij}$ will be free of . . ." should read -- Note that since $l_{jj}$ is a factor of $l_{i+1,i+1}$, $R_{ij}$ will be free of . . . --.

The 51$^{st}$ line of column 8, as set out in the printed patent, which reads ". . . back substitution step 280 where factors common to $l_{ii}$ and . . ." should read -- . . . back substitution step 280 where factors common to $l_{ii}$ and . . . --.

Th 54$^{th}$ line of column 8, as set out in the printed patent, which reads ". . . SLAEs systems $S_1$ and $S_2$, string arrays $(l_{ii})_1$ and $(r_i)_1$ . . ." should read -- . . . SLAEs systems $S_1$ and $S_2$, string arrays $(l_{ii})_1$ and $(r_i)_1$ . . . --.

The 55$^{th}$ line of column 8, as set out in the printed patent, which reads ". . . and $(l_{ii})_2$ and $(r_i)_2$ for system $S_2$ . . ." should read -- . . . and $(l_{ii})_2$ and $(r_i)_2$ for system $S_2$ . . . --.

The 58$^{th}$ line of column 8, as set out in the printed patent, which reads ". . . respective string arrays $l_{ii}$ and $r_i$ where shown . . ." should read -- . . . respective string arrays $l_{ii}$ and $r_i$ where shown . . . --.

The 2$^{nd}$ line of column 9, as set out in the printed patent, which reads ". . . step 290 calculates expressions $(l_{ii})_1*(r_i)_2$ and $(l_{ii})_2*(r_i)_1$ for . . ." should read -- . . . step 290 calculates expressions $(l_{ii})_1*(r_i)_2$ and $(l_{ii})_2*(r_i)_1$ for . . . --.

The 3$^{rd}$ line of column 9, as set out in the printed patent, which reads "If all the expressions $(l_{ii})_1*(r_i)_2$ and . . ." should read -- If all the expressions $(l_{ii})_1*(r_i)_2$ and . . . --.

The 4$^{th}$ line of column 9, as set out in the printed patent, which reads ". . . $(l_{ii})_2*(r_i)_1$ have been consistently . . ." should read -- . . . $(l_{ii})_2*(r_i)_1$ have been consistently . . . --.

The 6$^{th}$ line of column 9, as set out in the printed patent, which reads ". . . of $(l_{ii})_1*(r_i)_2$ with $(l_{ii})_2*(r_i)_1$." should read -- . . . of $(l_{ii})_1*(r_i)_2$ with $(l_{ii})_2*(r_i)_1$. --.

The 55$^{th}$ line of column 9, as set out in the printed patent, which reads "// contain $l_{ii}$" should read -- . . . // contain $l_{ii}$ --.

The 57$^{th}$ line of column 9, as set out in the printed patent, which reads "The solution will be $x_i=l_{ii}/r_i$." should read -- . . . The solution will be $x_i=l_{ii}/r_i$. --.

UNITED STATES PATENT AND TRADEMARK OFFICE
CERTIFICATE OF CORRECTION

PATENT NO.       : 7,043,510 B1
APPLICATION NO.  : 09/597478
DATED            : May 9, 2006
INVENTOR(S)      : Rajendra Kumar Bera It is certified that error appears in the above-identified patent and that said Letters Patent is hereby corrected as shown below:

The 49$^{th}$ line of column 11, as set out in the printed patent, which reads ". . . numerators r$_i$ and the denominators l$_{ii}$ can be found." should read -- . . . numerators $r_i$ and the denominators $l_{ii}$ can be found --.

The 51$^{st}$ line of column 11, as set out in the printed patent, which reads ". . . r$_3$ and the denominator l$_{33}$ are as follows:" should read -- . . . $r_3$ and the denominator $l_{33}$ are as follows: --.

The 57$^{th}$ line of column 11, as set out in the printed patent, which reads "Substituting numerator r$_3$ and denominator l$_{33}$ . . ." should read -- Substituting numerator $r_3$ and denominator $l_{33}$ . . . --.

The 64$^{th}$ line of column 11, the variable in the right hand side of the table, which reads "l$_{22}$" should read -- $l_{22}$ --.

The 13$^{th}$ line of column 12, the variable in the right hand side of the table, which reads "l$_{11}$" should read -- $l_{11}$ --.

The 64$^{th}$ line of column 12, the variable in the right hand side of the table, which reads "l$_{33}$" should read -- $l_{33}$ --.

The 17$^{th}$ line of column 13, as set out in the printed patent, which reads "Substituting numerator r$_3$ and denominator l$_{33}$ . . ." should read -- Substituting numerator $r_3$ and denominator $l_{33}$ . . . --.

The 24$^{th}$ line of column 13, the variable in the right hand side of the table, which reads "l$_{22}$" should read -- $l_{22}$ --.

The 40$^{th}$ line of column 13, the variable in the right hand side of the table, which reads "l$_{11}$" should read -- $l_{11}$ --.

The 52$^{nd}$ line of column 13, as set out in the printed patent, which reads "Performing step 290, the expressions (l$_{ii}$)$_1$*(r$_i$)$_2$ and (l$_{ii}$) . . ." should read -- Performing step 290, the expressions $(l_{ii})_1 * (r_i)_2$ and $(l_{ii})$ . . . --.

The 54$^{th}$ line of column 13, as set out in the printed patent, which reads ". . . example, calculating (l$_{22}$)$_1$*(r$_2$)$_2$ gives the following:" should read -- . . . example, calculating $(l_{22})_1 * (r_2)_2$ gives the following: --.

UNITED STATES PATENT AND TRADEMARK OFFICE
CERTIFICATE OF CORRECTION

| | | |
|---|---|---|
| PATENT NO. | : 7,043,510 B1 | |
| APPLICATION NO. | : 09/597478 | |
| DATED | : May 9, 2006 | |
| INVENTOR(S) | : Rajendra Kumar Bera | |

It is certified that error appears in the above-identified patent and that said Letters Patent is hereby corrected as shown below:

The 1$^{st}$ line of column 14, as set out in the printed patent, which reads "Step 290 similarly calculates the expressions $(l_{ii})_1*(r_i)_2$ . . ." should read -- Step 290 similarly calculates the expressions $(l_{ii})_1*(r_i)_2$ . . . --.

The 15$^{th}$ line of column 14, as set out in the printed patent, which reads "Similarly, calculating $(l_{22})_2*(r_2)_1$ gives the following:" should read -- Similarly, calculating $(l_{22})_2*(r_2)_1$ gives the following: --.

The 16$^{th}$ line of column 14, as set out in the printed patent, which reads ". . . and $(l_{ii})_2*(r_i)_1$ . . ." should read -- . . . and $(l_{ii})_2*(r_i)_1$ . . . --.

The 17$^{th}$ line of column 14, as set out in the printed patent, which reads ". . . $(l_{22})_1*(r_2)_2$ with $(l_{22})_2*(r_2)_1$, . . ." should read -- . . . $(l_{22})_1*(r_2)_2$ with $(l_{22})_2*(r_2)_1$, . . . --.

The 19$^{th}$ line of column 14, as set out in the printed patent, which reads ". . . of $(l_{ii})_1*(r_i)_2$ with $(l_{ii})_2*(r_i)_1$ . . ." should read -- . . . of $(l_{ii})_1*(r_i)_2$ with $(l_{ii})_2*(r_i)_1$ . . . --.

The 36$^{th}$ line of column 15, as the claim is set out in the printed patent, which reads "$(l_{ij})_k x_i=(r_i)_k$" should read -- $(l_{ii})_k x_i=(r_i)_k$ --.

The 38$^{th}$ line of column 15, as the claim is set out in the printed patent, which reads "wherein $l_{ij}$ . . ." should read -- wherein $l_{ii}$ . . . --.

The 42$^{nd}$ line of column 15, as the claim is set out in the printed patent, which reads ". . . $(l_{ii})_1*(r_i)_2$ and a second product $(l_{ii})_2*(r_i)_1$, . . ." should read -- . . . $(l_{ii})_1*(r_i)_2$ and a second product $(l_{ii})_2*(r_i)_1$, --.

The 60$^{th}$ line of column 15, as the claim is set out in the printed patent, which reads ". . . reduces the strings to the form $(l_{ii})_k x_i=(r_i)_k$ . . ." should read -- . . . reduces the strings to the form $(l_{ii})_k x_i=(r_i)_k$ . . . --.

The 3$^{rd}$ line of column 17, as the claim is set out in the printed patent, which reads "$(l_{ij})_k x_i=(r_i)_k$" should read -- $(l_{ii})_k x_i=(r_i)_k$ --.

The 5$^{th}$ line of column 17, as the claim is set out in the printed patent, which reads "wherein $l_{ij}$ . . ." should read -- wherein $l_{ii}$ . . . --.

The 9$^{th}$ line of column 17, as the claim is set out in the printed patent, which reads ". . . $(l_{ii})_1*(r_i)_2$ and a second . . ." should read -- . . . $(l_{ii})_1*(r_i)_2$ and a second --.

UNITED STATES PATENT AND TRADEMARK OFFICE
CERTIFICATE OF CORRECTION

PATENT NO.      : 7,043,510 B1
APPLICATION NO. : 09/597478
DATED           : May 9, 2006
INVENTOR(S)     : Rajendra Kumar Bera It is certified that error appears in the above-identified patent and that said Letters Patent is hereby corrected as shown below:

The 10$^{th}$ line of column 17, as the claim is set out in the printed patent, which reads "... product $(l_{ii})_2*(r_i)_l, \ldots$" should read -- ... product $(l_{ii})_2*(r_i)_l$ --.

The 29$^{th}$ line of column 17, as the claim is set out in the printed patent, which reads "... form $(l_{ii})_k x_i = (r_i)_k \ldots$" should read -- ... form $(l_{ii})_k x_i = (r_i)_k \ldots$ --.

The 32$^{nd}$ line of column 17, as the claim is set out in the printed patent, which reads "... of the strings to the form $(l_{ii})_k x_i = (r_i)_k \ldots$" should read -- ... of the strings to the form $(l_{ii})_k x_i = (r_i)_k \ldots$ --.

The 51$^{st}$ line of column 18, as the claim is set out in the printed patent, which reads "$(l_{ij})_k x_i = (r_i)_k$" should read -- $(l_{ii})_k x_i = (r_i)_k$ --.

The 53$^{rd}$ line of column 18, as the claim is set out in the printed patent, which reads "wherein $l_{ij} \ldots$" should read -- wherein $l_{ii} \ldots$ --.

The 57$^{th}$ line of column 18, as the claim is set out in the printed patent, which reads "... a first product $(l_{ii})_1*(r_i)_2$ and a second ..." should read -- ... a first product $(l_{ii})_1*(r_i)_2$ and a second ... --.

The 58$^{th}$ line of column 18, as the claim is set out in the printed patent, which reads "... product $(l_{ii})_2*(r_i)_l, \ldots$" should read -- ... product $(l_{ii})_2*(r_i)_l$ --.

The 2$^{nd}$ line of column 20, as the claim is set out in the printed patent, which reads "... reduces the strings to the form $(l_{ii})_k x_i = (r_i)_k \ldots$" should read -- ... reduces the strings to the form $(l_{ii} x_i = (r_i)_k \ldots$ --.

UNITED STATES PATENT AND TRADEMARK OFFICE
CERTIFICATE OF CORRECTION

PATENT NO. : 7,043,510 B1
APPLICATION NO. : 09/597478
DATED : May 9, 2006
INVENTOR(S) : Rajendra Kumar Bera It is certified that error appears in the above-identified patent and that said Letters Patent is hereby corrected as shown below:

The 5th line of column 20, as the claim is set out in the printed patent, which reads "... of the strings to the form $(l_{ii})_k x_i = (r_i)_k$ ..." should read -- ... of the strings to the form $(l_{ii})_k x_i = (r_i)_k$ ... --.

Signed and Sealed this

Twenty-fifth Day of November, 2008

JON W. DUDAS
*Director of the United States Patent and Trademark Office*